Sept. 27, 1938. V. VALLETTA 2,131,339
CHECKING DEVICE FOR MOTOR CAR DOORS
Filed Oct. 6, 1937
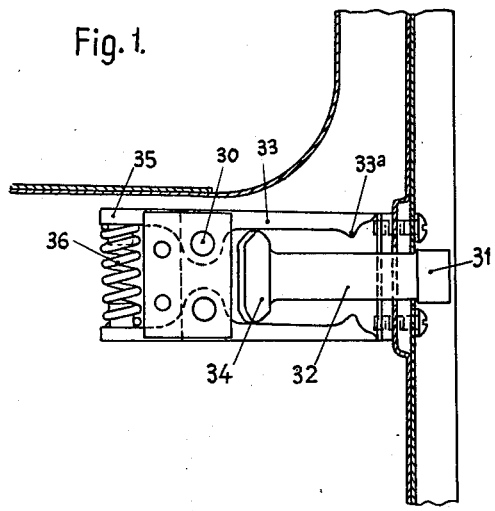
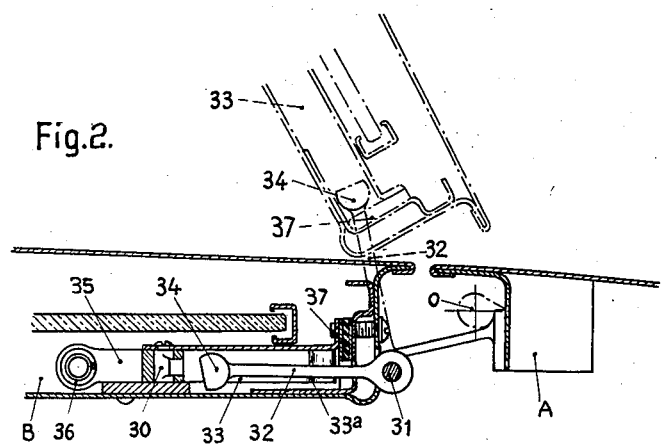
Inventor
Vittorio Valletta
By Sommers + Young
Attys Patented Sept. 27, 1938

2,131,339

UNITED STATES PATENT OFFICE 2,131,339

CHECKING DEVICE FOR MOTOR CAR DOORS

Vittorio Valletta, Turin, Italy, assignor to Fiat Società Anonima, Turin, Italy

Application October 6, 1937, Serial No. 167,666
In Italy October 14, 1936

2 Claims. (Cl. 16—85)

With many motor cars, particularly those having streamlined coachwork and inwardly inclined side walls, the doors tend to close as soon as they are released after having been opened—owing to the inclination of the hinge axis, and especially when the car is on uneven ground—thereby disturbing passengers stepping in and out of the car.

The present invention provides a device automatically acting to maintain the door resiliently in the open position in such manner as to allow it to be closed under slight effort applied to the door in the usual way.

According to the invention the device comprises at least one lever which is mounted in a recess in the door, or in the pillar of the door opening, and which resiliently clamps between two guide surfaces the head of an arm eccentrically pivoted, with respect to the door hinge axis, to the pillar of the door opening, or to the door frame, said guide surfaces having seats which the head abuts when the door is opened.

More particularly, the two guide surfaces are provided by a pair of levers subjected to the action of a spring tending to draw them together against the head of the pivoted arm, said levers being formed with projections past which the head of said arm snaps as the fully open position of the door is reached and against which the head then bears.

In the accompanying drawing:

Figs. 1 and 2 show an elevation partly in section and a horizontal sectional view, respectively, of a preferred embodiment of the invention.

In the embodiment of the invention shown in Figs. 1 and 2, the reference character A designates a door pillar of the coachwork and B refers to the door which is hinged to the pillar A in conventional manner, on an axis represented in Fig. 2 by pivot O. An arm 32 articulately connected with a bracket on the door pillar at 31 eccentrically with respect to the axis O has a head 34 which cooperates with resilient means constituted by the long arms 33 of a pair of levers mounted on pivots 30 carried by the door, the shorter arms 35 of said levers being under the action of a spiral spring 36. The arms 33 of the levers have noses 33a which are struck by the head 34 towards the end of the opening movement of the door, the spring 36 moving them towards each other again after they have been moved apart during the passing of the head. To close the door the pressure of the arms 33 has to be overcome which is done by the head 34 abutting the noses 33a in a contrary direction causing them to move apart. Immediately the head 34 has passed the noses these again move towards one another under the action of the spring 36. At the end of the opening movement of the door the head 34 strikes a damper or cushion 37 fixed to the door.

What I claim is:

1. In combination with a door hinged to the body of motor cars, a checking device for said door comprising a stay arm pivoted eccentrically with respect to the axis of the door hinge and arranged to oscillate by effect of the movements of the door, a head on said arm, two levers arranged on opposite sides of the path of said head, a guide surface on each lever for said head, a spring acting on said levers and tending to draw them together and clamp their guide surfaces against said head, and a nose on each of said levers arranged at an end of the guide surfaces thereof to engage said head when the door is opened.

2. In combination with a door provided with a recess and hinged to a pillar of the body of motor cars, a checking device for said door comprising a bracket secured to said pillar, a stay arm pivoted eccentrically to said bracket and entering said recess in the door, a head on said arm, a supporting plate in said recess in the door, a lever pivoted to said supporting plate, a guide surface on said arm, two levers arranged on opposite sides of the path of said head, a guide surface on each lever for said head, a spring acting on said levers and tending to draw them together and clamp their guiding surfaces against said head, and a nose on each of said levers arranged at the end of the guide surfaces thereof to engage said head when the door is opened.

VITTORIO VALLETTA.